United States Patent

Mezey

[15] 3,681,828
[45] Aug. 8, 1972

[54] METHOD OF MAKING ROTORS FOR VARIABLE CAPACITORS

[72] Inventor: Frank G. J. Mezey, 115 Monroe Drive, Centerport, N.Y. 11721

[22] Filed: May 21, 1970

[21] Appl. No.: 39,440

[52] U.S. Cl. ............... 29/25.42, 264/58, 264/61, 264/67, 317/253, 317/261
[51] Int. Cl. ........................................ H01g 13/00
[58] Field of Search ..29/25.42, 25.41; 317/253, 254, 317/261; 264/58, 61, 67; 156/306, 89

[56] References Cited

UNITED STATES PATENTS

| | | | |
|---|---|---|---|
| 2,839,816 | 6/1958 | McGraw | 29/25.42 |
| 3,189,974 | 6/1965 | Fabricius | 29/25.42 |
| 3,244,951 | 4/1966 | Wallace | 317/249 |
| 3,235,939 | 2/1966 | Rodriquez et al. | 29/25.42 |
| 3,506,895 | 4/1970 | Kellerman | 317/261 |

Primary Examiner—John F. Campbell
Assistant Examiner—Carl E. Hall
Attorney—Edward H. Loveman

[57] ABSTRACT

A method of making rotors for variable capacitors which employs a thin glass plate and a thicker backing glass plate onto each of which is positioned an array of metalized electrodes in identical patterns. The plates are juxtaposed to place the electrodes in registration and the assembly of plates is then fired to fuse them and form an integral monolithic glass body with electrodes of the thin plate embedded in the glass body. Holes are bored in the glass body through the electrodes and the electrodes are then electrically connected together by metalizing interiors of the holes. The rotor discs are then cut out of the glass body, each disc including one pair of registering electrodes. Conductive members are then added to complete the rotor assembly.

7 Claims, 10 Drawing Figures

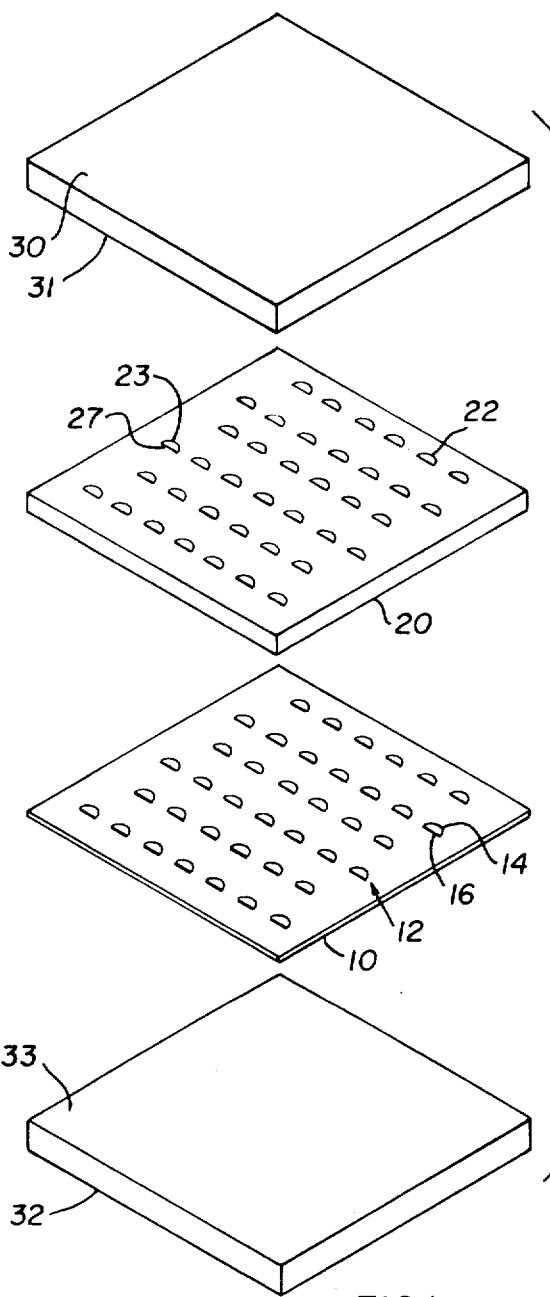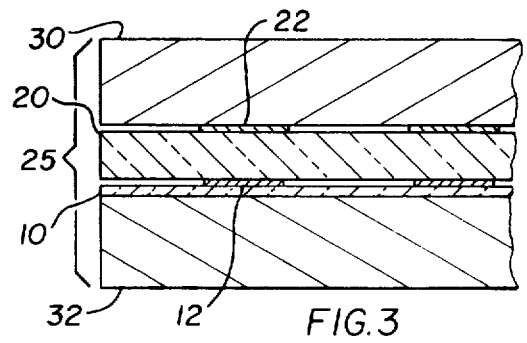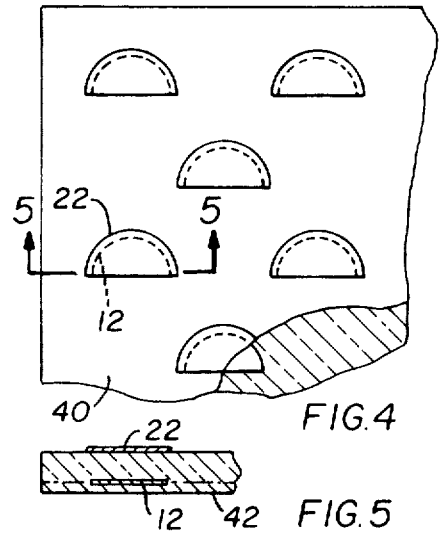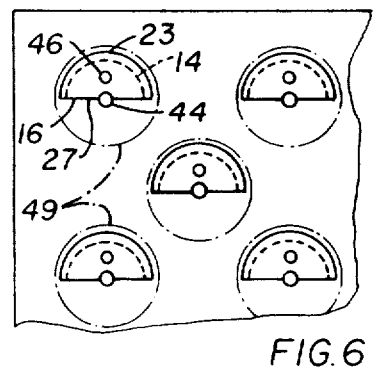

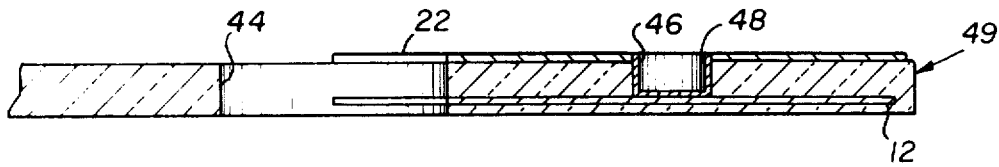

FIG. 8

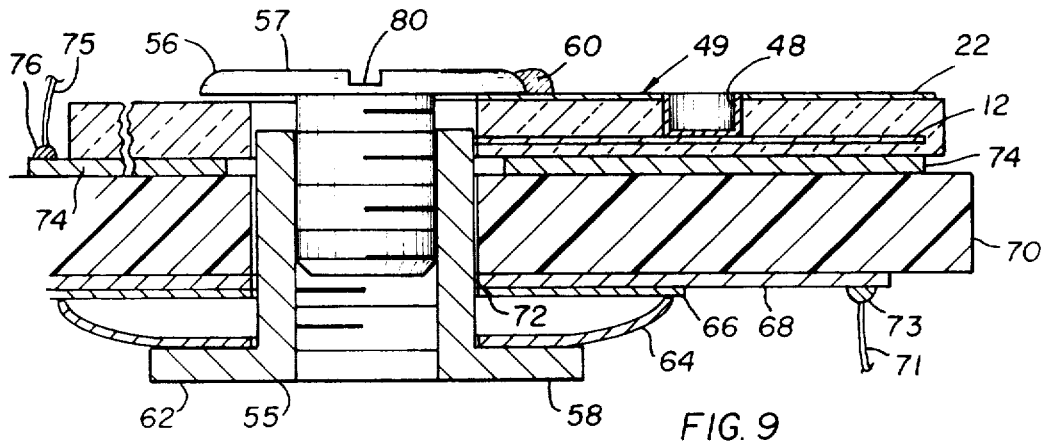

FIG. 9

| I | APPLY SEMI-CIRCULAR METAL ELECTRODES TO GLASS PLATES; LARGER ELECTRODES ON ONE SIDE OF THICKER GLASS PLATE. SMALLER ELECTRODES ON ONE SIDE OF THINNER GLASS PLATE. |
|---|---|
| II | BOND GLASS PLATES TOGETHER TO FORM MONOLITHIC BODY WITH LARGER ELECTRODES ON ONE OUTER SIDE AND WITH SMALLER ELECTRODES INSIDE THE MONOLITHIC BODY ADJACENT OTHER SIDE. |
| III | BORE HOLES IN MONOLITHIC STRUCTURE; METALLIZE OFF CENTER HOLE TO CONNECT OUTSIDE AND INSIDE ELECTRODES. |
| IV | CUT OUT CIRCULAR ROTOR DISCS. |
| V | COMPLETE ASSEMBLY OF ROTOR AND CAPACITOR. |

FIG. 10

INVENTOR
FRANK G. J. MEZEY

BY Edward H. Loveman
ATTORNEY

METHOD OF MAKING ROTARS FOR VARIABLE CAPACITORS

This invention concerns a method for making rotors for variable capacitors and more specifically for a method of making solid state monolithic rotors for variable capacitors.

Trimmer capacitors are well known in the art and are generally comprised of a rotor having a metalized conductor portion which serves as one plate of the capacitor. A stationary plate, also having a conductive portion is mounted on a stator which rotably supports the rotor. Rotation of the rotor changes the capacitance between the conductive rotary plate and the stationary conductive plate. A typical capacitor of this type is described in U.S. Pat. No. 3,244,951.

Heretofore considerable difficulties have been encountered in manufacturing such variable capacitors in miniature sizes required by present day electronic circuits. The apparatus described in the above mentioned patent comprises a stack of thin, unfired flexible ceramic discs assembled prior to firing. One disc has a metalized top portion. The assembly of discs is compressed under high pressure, i.e., 15 tons or more per square inch. Then the assembly is fired at high temperature to fuse the stack of discs into a monolithic structure. While such a method can theoretically lead to a useful rotor structure for a variable capacitor it is not adapted to high precision mass production manufacturing requirements, because the rotors must be individually assembled by hand. The equipment, facilities and quality controls required to handle flexible ceramic discs having a thickness of 0.02 in. or less and a diameter of 0.2 inch or less are very costly, and the painstaking skill and labor time required preclude high production rates.

The present invention is directed at a method of making a rotor for a trimmer capacitor which overcomes the above and other difficulties and disadvantages of prior manufacturing methods. According to the invention a multiplicity of thin semicircular spots of silver or other metallic paste are applied in spaced array to one side of a thin sheet or plate of glass. This is done by silk screening, vapor deposition or some printing process. Another multiplicity of semicircular metallic spots is applied in a similar array to a thick plate of glass. If necessary the plates are heated sufficiently to drive off all volatile components of the metallic paste and to solidify and set the spots and thus form electrodes as very thin films on the glass plates. The plates are then placed one on top of the other with the electrodes in registration with each other but separated by the thickness of the thick glass plate. The assembly is placed between ground and polish optically flat inert, infusable, plates or blocks. This assembly is then fired, preferably in a vacuum furnace. The glass plates fuse to each other to form a monolithic body with the metallic electrodes of the thinner plate embedded inside of the rigid solid glass body. Holes are drilled in the glass body through each vertical pair of electrodes which are then electrically connected together. Cylindrical discs emcompassing the vertical pair of electrodes are cut out of the monolithic body by core drilling, ultrasonic machining or other suitable method to form individual capacitor rotors. The rotors are then ready for assembly with other parts to form the complete variable capacitors. An important feature of the process is that a multiplicity of rotors can be made simultaneously. The precise registration required between metallic electrodes in all the rotors is accomplished by simply overlaying one glass plate on the other. It is only when the rotor assemblies are substantially complete that they are cut of the monolithic glass body. This represents a radical departure from prior manufacturing methods where each rotor is individually assembled by hand.

Accordingly it is a primary object of the present invention to provide for improved method for manufacturing variable capacitor rotors.

Another object of the present invention is to provide a high precision, mass production manufacturing method for making trimmer capacitor rotors.

A more specific object of the present invention is to provide a method of manufacturing a solid state rotor assembly comprised of a plurality of extremely thin discs which do not have to be assembled individually.

These and other objects and many of the attendant advantages of this invention will be readily appreciated as the same becomes better understood by reference to the following detailed description when considered in connection with the accompanying drawings, wherein:

FIG. 1 is an exploded perspective view of parts of an assembly of plates illustrating one stage of the manufacturing method according to the invention;

FIG. 2 is an end elevational view of the plates of FIG. 1 in assembled position at another stage in the manufacturing method;

FIG. 3 is an enlarged fragmentary sectional view taken along line 3—3 of FIG. 2;

FIG. 4 is a fragmentary enlarged top plan view of the monolithic structure or body at another stage of the manufacturing method;

FIG. 5 is a fragmentary cross sectional view taken along line 5—5 of FIG. 4;

FIG. 6 is a fragmentary top plan view similar to FIG. 4 showing the monolithic body at a further stage of the manufacturing method;

FIG. 7 is an enlarged top plan view of a single rotor disc as cut from the monolithic body of FIG. 6;

FIG. 8 is an enlarged cross sectional view taken along line 8—8 of FIG. 7;

FIG. 9 is a cross sectional view showing part of a complete variable capacitor assembly including the rotor disc of FIG. 7; and FIG. 10 is a flow chart of steps in the manufacturing method according to the invention.

Referring now to the drawings, wherein like reference characters designate like or corresponding parts throughout the several views there is shown in FIG. 1 to FIG. 3 a rectangular glass plate generally designated as reference numeral 10.

This plate may have a thickness ranging from 1 to 10 mils (0.001 to 0.010 inch). On the upper surface of the plate is an array of extremely thin electrodes, generally designated as reference numeral 12, made of a metal suitable for capacitor plates. This metal may be silver, gold, palladium or the like. The pattern or array may be made by applying spots of metal paste by silk screen, printing, vapor deposition or other process capable of producing precisely defined and located thin films on a flat glass surface. The array of electrodes are preferably semicircular and each electrode has a semicircular edge 14 and a straight diametral edge 16; however, these films could have elliptical, spiral, or other geometrical shapes. The metallization of plate 10 to form electrodes 12 is part of step I in the method outlined in the chart of FIG. 10. On another glass plate 20 which is materially thicker than plate 10 is another array of metallized electrodes 22 each of which has a semicircular edge 23 and a straight diametral edge 27. The array or pattern of electrodes 22 is identical to that of electrodes 12. The application of electrodes 22 to plate 20 is also part of step I as indicated in the chart of FIG. 10. Plate 20 overlays plate 10 in the assembly 25 shown in FIGS. 2 and 3. Each electrode 22 registers with a corresponding electrode 12. The edges of the plates are readily disposed in registration with each other by use of a simple jig or fixture (not shown). Mere superposition of the plates 10 and 20 places all the electrodes 12 and 22 in registration with each other. The electrodes 12 may be slightly smaller than the electrodes 22 to prevent arcing or voltage breakdown between the electrodes 12 and the associated stator electrode in the completed variable capacitor. The electrodes 12 may be approximately 0.2 inch in diameter, for example.

On opposite sides of the plates 10 and 20 are placed rectangular graphite plates or blocks 30, 32 respectively. These blocks have ground, polished and optically flat inner surfaces 31, 33 juxtaposed to the top of the plate 20 and the bottom of the plate 10 respectively. The plate 20 may have a thickness in the order of 0.01 to 0.10 inch. In place of graphite, some other rigid, inert, infusible material such as a fired ceramic may be used for the plates or blocks 30, 32. In the assembly 25 which is held together by a suitable clamping fixture (not shown), it will be noted that the electrodes 12 face the underside of the plate 20 and the electrodes 22 are on the upper side of the plate 20. The assembly 22 is placed in a suitable furnace such as a vacuum furnace and heated under vacuum or low pressure until the plates 12 and 20 fuse to each other to form an integral, monolithic structure or body 40 shown in FIGS. 4 and 5. The electrodes 12 are embedded in the body 40 close to the underside 42 of the body. The spacing may be as small as 0.001, which is much less than can be practicably obtained by prior methods such as the individual disc assembly method of the above mentioned U.S. Pat. No. 3,244,951. As a result, the variable capacitors finally produced may each have a maximum capacitance as much as twice as that attainable in capacitors of the same size produced by prior methods. The bonding together of plates 10 and 20 is indicated as step II in the chart of FIG. 10. FIGS 4 and 5 show the alignment or registration of the electrode 12 with each slightly larger electrode 22 in the body 40.

FIG. 6 shows the body 40 at a further manufacturing stage. Here holes 44 and 46 have been drilled in the body 40. The holes 44 are larger and are located at the centers of the straight diametral edges 16, 23 of the electrodes 12 and 22, respectively. It will be noted that the diametral edges 16 and 27 are in perfect registration while the arcuate edge 14 of the electrode 12 is slightly spaced from and within the arcuated edge 23 of the electrode 22, as clearly illustrated in FIGS. 3 to 8. Each of the holes 44 is centrally drilled or bored entirely through the body 40 to serve as a center or axis of rotation of the rotor in the complete capacitor. On the other hand the holes 46 are each drilled only through the body 40 down to the electrode 12 to expose a portion of this electrode at the bottom of the hole. The holes 46 are located off center or eccentrically with respect to the centers of holes 44. The drilling of holes 44, 46 is indicated as part of step III in the chart of FIG. 10.

After the holes 44, 46 are drilled, the interiors thereof are metallized with silver or other metal by vacuum deposition or other suitable process. This forms a cup shaped lining 48 for each hole 46 as clearly shown in FIGS. 8 and 9, and serves as an electrical connector between each pair of the electrodes 12 and 22. The metallizing of the off center holes 46 is indicated as step III in FIG. 10. Circular discs 49 may now be cut out of the monolithic body 40 as indicated by dotted lines in FIG. 6. This is step IV in FIG. 10. The discs 49 are slightly larger diametrally than the larger electrodes 22. FIGS. 7, 8 and 9 show the circular discs 49 cut out of the body 40. The capacitor rotor may now be assembled to a stator to complete the assembly.

FIG. 9 shows a completed capacitor assembly 50. A rotor assembly 55 includes the monolithic disc 49, the semicircular electrodes 12, 22, and the connecting conductor 48. A screw 56 is inserted through a hole 44 and is engaged by a sleeve nut 58. A head 57 of the screw 56 is secured by a solder joint 60 to the electrode 22. A head 62 of the nut 58 bears against a metal spring washer 64 which bears on a flat metal washer 66. The washer 66 bears against a contact plate 68 applied to the underside of an insulative plate 70. A wire 71 is secured by a solder joint 73 to the plate 68. The sleeve nut 58 extends axially through a hole 72 in plate 70. A conductive stator plate 74 is secured to the upper side of insulative plate 70. A wire 75 is secured by a solder joint 76 to the plate 74. The rotor disc 49 bears the stator plate 74. The spacing between plate 74 and electrode 12 may be small as 0.001 inch. The dielectric between the electrode 12 and the plate 74 is glass which formerly formed part of the glass plate 10.

The variable capacitor is adjusted by turning the rotor 55. This may be accomplished by engaging a tool such as a screwdriver in a slot 80 of screw head 57. The completion of the rotor assembly and the capacitor assembly is indicated as step V in the chart of FIG. 10.

It will be apparent from the foregoing detailed description of the manufacturing method that a plurality of capacitor rotors can be simultaneously produced. Individual handling of fragile glass or ceramic discs 0.001 inch or so in thickness is avoided. Perfect registration of the electrodes in all rotors is simultaneously effected. As many rotors can be made at one time as desired, such as 10, 50, a 100 or more All are precision made. Manufacturing costs are thus minimized. Large savings are effected in labor cost, time and materials. Much expensive, complex equipment required by prior manufacturing methods are not needed in the present method. The resulting products are additionally superior in precision, higher in capacitance, and more rugged in construction.

Obviously, the foregoing disclosure relates to only preferred embodiments of the invention and that it is intended to cover all changes and modifications of the examples of the invention herein chosen for the purposes of the disclosure, which do not constitute departures from the spirit and scope of the invention.

I claim:

1. A method of making rotors for variable capacitors, comprising the steps of:
   discretely applying first electrodes in a first spaced array to a first thin, fusible, flat dielectric plate;
   discretely applying second electrodes in a second spaced array to a second fusible, flat, dielectric plate thicker than said electrodes on said first plate;
   stacking the side of said first plate having said first electrodes thereon to the side of said second plate, opposite the side said second electrodes are applied, such that each of said discrete first electrodes are vertically aligned with a corresponding discrete second electrode;
   firing said plates to bond them together and form an integral, monolithic body with said first electrodes embedded in said body; and
   cutting a plurality of discs out of said body with each disc containing one of said first electrodes and one of said second electrodes.

2. A method as defined in claim 1, further comprising the step of drilling first holes in said body to serve as centers of rotation for said discs, and second holes to expose portions of said first electrodes.

3. A method as defined in claim 2, further comprising the step of inserting a conductive element in each of said second holes to electrically connect each pair of aligned first and second electrodes.

4. A method as defined in Claim 1, wherein said discrete applying of first electrodes and said discrete applying of second electrodes each comprises the step of metallizing films bonded respectively to said first and second plate.

5. A method as defined in claim 2, further comprising the step of metallizing the interior of each of said second holes to connect each pair of registering first and second electrodes mechanically and electrically.

6. A method as defined in claim 1 wherein the step of firing said plate comprises the step of placing blocks on opposite sides of said first and second plates to form an assembly,
   placing the assembly into a vacuum furnace and heating the furnace to a temperature such that said plates fuse to each other to form an integral monolithic structure.

7. A method as defined in claim 6, further comprising the step of clamping said rectangular blocks together to form a rigid assembly.

* * * * *